April 23, 1946.                H. J. HART                2,399,117
                            MOLDING OF PLASTICS
                            Filed Jan. 15, 1945
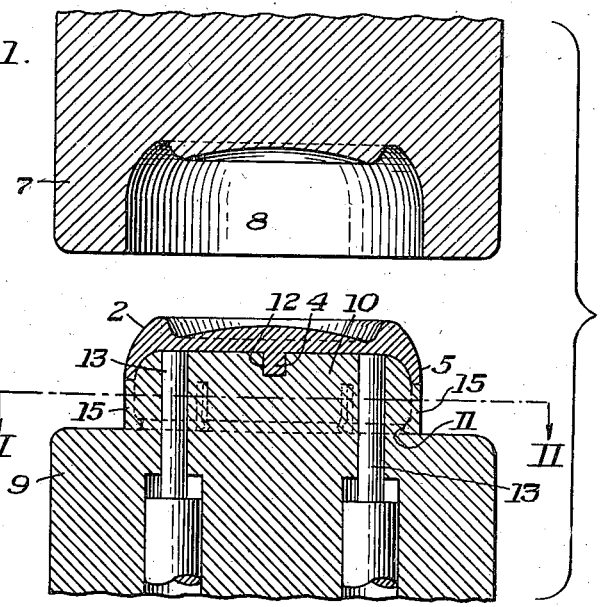
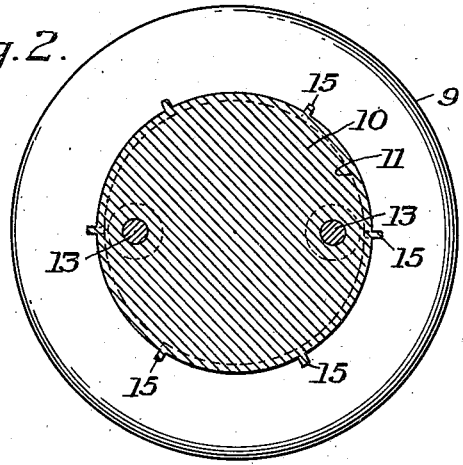
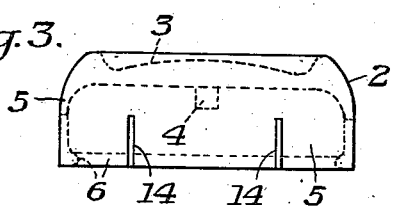
INVENTOR
Harry J. Hart
by Christy, Parmelee and Strickland
his attorneys Patented Apr. 23, 1946

2,399,117

UNITED STATES PATENT OFFICE 2,399,117

MOLDING OF PLASTICS

Harry J. Hart, Baldwin Township, Allegheny County, Pa.

Application January 15, 1945, Serial No. 572,833

6 Claims. (Cl. 18—42)

My invention relates to the molding of articles of plastic material, and consists in certain new and useful improvements in apparatus.

More particularly, certain cup-shaped or tubular articles formed of plastic material essentially have one or more internal protuberances on their side walls, thereby making it difficult to remove the finished articles from that particular one of the co-operating molding dies which includes the sunken recesses or matrices for forming the protuberances. It is known that certain molding plastic materials temporarily possess an inherent elasticity immediately after they are molded under heat and pressure between forming dies, and that such temporary elasticity is adequate to permit a molded article with a protuberance on the internal surface of its circumferential side wall to be sprung from the male die after the male and female dies have been separated upon the termination of a molding operation, it having been found that the side wall of the article at such instant may be radially expanded sufficiently to permit the internal protuberances to clear the sunken recesses in the male die, and that after removal from the die the side wall of the article returns to its molded shape and sets. This phenomenon has been utilized in the molding of internally threaded plastic caps for bottles, and the like, the internal protuberances on the walls of such molded articles comprising the screw thread of the cap. However, in the case of articles having larger or deeper protuberances on their side walls than those formed by the threads on molded bottle caps of usual size, the circumferential expansion required to clear the protuberances from the matrices in the die exceeds that which is permitted by the temporary elastic limit of the molded plastic material, with the result that it has been considered practically necessary to construct the male dies which include protuberance-forming recesses of a collapsible structure in order to free the molded article therefrom.

My present invention stems from the discovery of how the circumferential side wall of a molded plastic article may be distended beyond the extent otherwise permitted by the normal temporary elasticity of the molded plastic material, without rupture of the molded wall and without destruction of the capacity of the distended wall portions to return to molded shape and then to set or harden. Thus, articles having protuberances of extraordinary depth or thickness may be made more economically and with greater speed, as in the case of the molded screw caps, above alluded to. The invention embraces certain new and useful improvements in die structure that are particularly effective to the ends in view.

The invention will be understood upon reference to accompanying drawing, in which:

Figure 1 is a view in axial section of a pair of cooperating molding dies in which and in the operation of which the invention may be realized. The dies are shown in separated position, at the end of a molding operation, and the molded article is shown in position on the male die, ready to be dislodged;

Figure 2 is a view in transverse section of the male die, as seen on the plane II—II of Figure 1; and Figure 3 is a view in side elevation of the molded article, which is exemplary of the various cup-shaped or tubular articles which may be produced in accordance with the improvements of my invention.

Referring to the drawing the reference numeral 2 is applied to the article which I have chosen as one of the many cup-shaped or tubular articles of molded thermo-plastic or thermo-setting plastic material that may be produced in an apparatus of my invention. The article 2 includes a basal or diaphragm wall portion 3 having an integral stud 4 formed thereon, and having a circumferential or tubular wall portion 5 integrally formed with and extending normal to said basal wall portion. At the rim of the cup, that is, at the edge of the wall portion 5, a circumferential rib or bead 6 forms a protuberance on the internal surface of the wall portion 5, and in exemplary way in Figure 1 is shown a pair of molding dies which are constructed in accordance with the invention for the production of such article. It may be mentioned that the stud 4 is shown as exemplary of the various forms of protuberances or perforations that may be molded in the wall of article.

The dies are shown fragmentarily in Figure 1. They consist in a female die 7 having a matrix 8 in the form of the external surfaces of the article 2, and a male die 9 having a portion 10 shaped in the form of the interior of the article. The male die portion 10 includes a circumferential groove or recess 11 sunk laterally into its body to provide the matrix portion that forms the protuberance 6 on the internal surface of the article, and a recess 12 for forming the stud 4. It will be understood that conventional means (not shown) will be provided for heating the dies, and that the dies will be arranged in a suitable press for moving them into molding position, to form a matrix in which a charge of plastic material may be shaped into the form of the article 2, and then moving them apart into discharge position. When the dies are arranged as shown in Figure 1, with the male die below the female, the charge of plastic material may comprise a preformed blank of the material. On the other hand, if it be desired to use charges of the plastic material in powdered or granular or fluid form, the dies may be inverted or otherwise arranged in different position from that in which they are shown so that the matrix of the female die will be adapted properly to receive and shape the charge. There will be no uncertainty in the minds of those skilled in the art as to how the molding operation may be conducted. The procedure is in accordance with known practice. In further accord with known practice two or more stripper pins 13 extend through the male die, and are arranged to be operated to eject the article from the male die when, after a molding operation, the dies are separated or opened.

As mentioned in the foregoing specification, when the plastic material is newly molded and the dies opened, the material possesses a certain elasticity, by virtue of which molded articles, having such internal protuberances as the screw threads of small bottle caps, may be forced or sprung from the male die, the tubular side wall of the cap yielding or distending sufficiently, to permit of the clearance of the molded cap from the dies, and then returning to its molded shape and permanently setting or hardening. However, in the case of molded articles having relatively deep or thick internal protuberances, such as herein shown, the degree of distention or radial expansion of the circumferential side wall required to permit the protuberance to clear the complementary recess or matrix portion in the die exceeds the limit of the temporary elasticity of the molded material, whereby the side wall is ruptured or permanently distorted.

In overcoming this difficulty, I provide means which are effective during the article-producing operation to form one or more slits 14 in the circumferential or tubular wall of the article. Each slit extends through the wall and transversely of and through the protuberance, and preferably extends inward from the lip or edge of the tubular wall for a distance sufficient to augment the safe outward expansion of the temporarily elastic wall to the degree necessary to permit the protuberance 6 to clear the matrix portion or recess 11. Thus, the formed article may be readily and quickly removed from the male die by means of the conventional stripper pins. In a sense it may be said that lateral flexibility of the article side wall is thus provided, to assist or complement the distension obtainable through the temporary elasticity thereof. When the article is removed from the die 10, the flexed wall returns to the position in which it was molded, and the plastic material that forms the body of the article sets or hardens in customary way. The slitted side wall of the article, while more yieldable to laterally applied pressure than an unslit wall, has all the strength required in most cases. Indeed, the greater flexibility of the side wall of the finished article sometimes proves to be a desirable characteristic in the finished article.

The means for forming the slits in the side wall of the article advantageously consist of blades or fins 15 that extend radially outward from the matrix groove 11 and side wall of the male die. In this case the blades 15 are shown to be formed integrally with the body of the die, although it will be apparent that they may be formed as independent elements that are welded to, or inset in the body of the die. The blades extend axially of the die a distance equal to the extent or length of the slots desired in the side wall 5, and the blades extend laterally from the side face of the die an effective distance at least equal to the thickness or depth of the matrix formed by and between the two dies 7 and 9. In this case the outer edges of the blade bear snugly upon the surface of the internal wall of the matrix in the female die, and, when the dies are pressed together in molding position, form partitions that are spaced apart circumferentially of the matrix portion that forms the side wall of the molded article.

Sometimes it is desired that the finished article shall have complete integrity; that is, shall have an unslitted, continuous side wall. In such cases the blades 15 are formed thinner than they are herein shown. Immediately after the molded article is sprung from the male die it is heated and the side wall compressed radially inward.

The side wall is healed or united at the slits. This operation of healing the slits or "cuts" in the side wall is readily effected before the molded plastic material permanently sets. Of course, if the plastic material or molding compound is thermo-plastic, the healing may be accomplished at any time under the effect of appropriately applied heat and pressure.

I have shown the protuberance 6 to be on the internal surface of the circumferential or tubular side wall 5, but it is to be understood that, if such protuberance were formed on the external surface of the side wall, the matrix or recess portion 11 would be formed in the matrix wall of the female die, and that the male die would be withdrawn from the molded article, when the dies are separated, leaving the molded article within said matrix of the female die. The stripper pins 13 in such case will be organized in the female die, and will be operated to dislodge the article, it being understood that the slit side wall of the article is adapted to yield inward to permit the clearance of the protuberance from the die.

Within the terms of the appended claims the engineer may perceive many modifications and variations in the structure described, without departing from the spirit of the invention.

I claim:

1. Apparatus for molding of plastic material an article having a circumferential wall formed with an internal protuberance, said apparatus comprising co-operating male and female dies between which such material is molded into the form of said article, said male die including a lateral sunken recess for the formation of said internal protuberance on said circumferential wall of the article, and said apparatus including means effective during the operation to form a slit in said circumferential wall of the molded article, whereby when the dies are separated the circumferential wall of said article may be distended beyond the extent otherwise permitted by the normal elasticity of the molded material and the article with its internal protuberance sprung free from said male die.

2. Apparatus for molding of plastic material an article having a circumferential wall formed with an internal protuberance, said apparatus comprising co-operating male and female dies between which such material is molded into the form of said article, said male die including a lateral sunken recess for the formation of said internal protuberance on said circumferential wall of the article, and means extending transversely of the matrix formed by and between said dies for forming a slit in said circumferential wall of the molded article, whereby when the dies are separated the circumferential wall of said article may be distended beyond the extent otherwise permitted by the normal elasticity of the molded material and the article with its internal protuberance sprung free from said male die.

3. Apparatus for molding of plastic material an article having a circumferential wall formed with an internal protuberance, said apparatus comprising co-operating male and female dies between which such material is molded into the form of said article, said male die including a lateral sunken recess for the formation of said internal protuberance on said circumferential wall of the article, and a blade extending outward from the side of said male die to form a slit extending inward from the edge of said circumferential wall of the molded article, whereby when the dies are separated the circumferential wall of said article may be distended beyond the extent otherwise permitted by the normal elasticity of said article of the molded material and the article with its internal protuberance sprung free from said male die.

4. Apparatus for molding of plastic material an article having a circumferential wall provided adjacent a peripheral edge thereof with a protuberance, said apparatus comprising co-operating male and female dies between which plastic material is molded into the form of said article, one of said dies including a lateral sunken recess for the formation of said protuberance on said circumferential wall of the article, and means for forming a slit in said wall inward from said edge thereof, whereby when the dies are separated the circumferential wall of the molded article may be displaced beyond the extent otherwise permitted by the normal elasticity of said article of the molded material and the article with its internal protuberance sprung free from said male die.

5. Apparatus for molding of plastic material an article having a circumferential wall provided adjacent a peripheral edge thereof with a protuberance, said apparatus comprising co-operating male and female dies between which plastic material is molded into the form of said article, one of said dies including a lateral sunken recess for the formation of said protuberance on said circumferential wall of the article, and means comprising a plurality of blades spaced circumferentially of the male die and extending laterally outward therefrom to form slits in said wall inward from said edge thereof, whereby when the dies are separated the circumferential wall of the molded article may be displaced beyond the extent otherwise permitted by the normal elasticity of the molded material and the article with its internal protuberance sprung free from said male die.

6. Apparatus for molding of plastic material a cup-shaped article whose circumferential side wall is provided adjacent its lip with an internal protuberance, said apparatus comprising co-operating male and female dies between which plastic material is molded into the form of said article, the male die having a lateral sunken recess for the formation of said internal protuberance on said side wall of the article, and means comprising a plurality of blades spaced circumferentially of the male die and extending laterally outward therefrom to form slits in said wall inward from the edge thereof, whereby when the dies are separated the circumferential wall of said article may be distended beyond the extent otherwise permitted by the normal elasticity of said article of the molded material and the article with its internal protuberance sprung free from said male die.

HARRY J. HART.